Oct. 29, 1963  R. M. FRASER  3,108,399
PLANT GROWTH CABINETS
Filed Feb. 13, 1961  2 Sheets-Sheet 1

INVENTOR:
RUSSELL M FRASER
By
Fetherstonhaugh & Kent
HIS ATTYS.

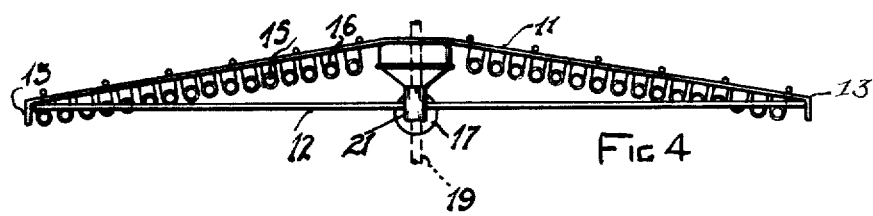
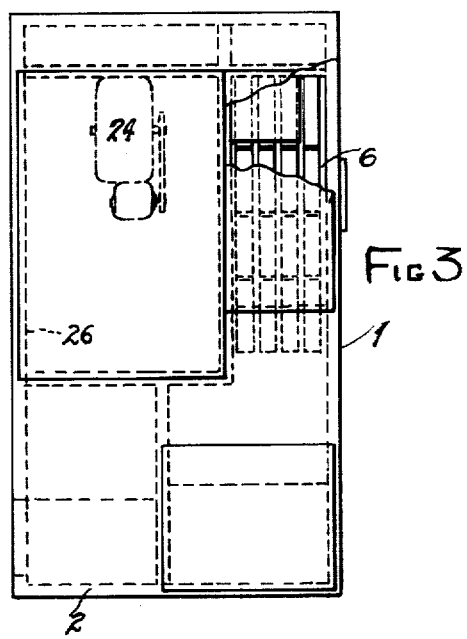

United States Patent Office 3,108,399
Patented Oct. 29, 1963

3,108,399
PLANT GROWTH CABINETS
Russell M. Fraser, 634 Campbell St., Winnipeg, Manitoba, Canada
Refiled for abandoned application Ser. No. 608,851, Sept. 10, 1956. This application Feb. 13, 1961, Ser. No. 88,944
1 Claim. (Cl. 47—17)

My invention relates to new and useful improvements in plant growth cabinets, the principal object and essence of my invention being to provide a complete sectional cabinet within which plants may be grown and rigidly controlled temperature, light and humidity conditions by the provision of an insulated cabinet having a movable light source and means associated with the cabinet whereby the temperature can be maintained within limits by air circulation and refrigeration processes, and which requires no external machinery housing or equipment.

Another object of my invention is to provide a device of the character herewithin described where plant seeds can be grown under control relative to humidity, light and temperature conditions quicker than before possible because lamp temperatures are for the first time temperature controlled for maximum light output, but ensuring that the plants do not suffer from over-heating or over-cooling.

Still further object of my invention is to provide a device of the character herewithin described wherein extensive experiments can be carried out under rigidly controlled conditions, of plant growth and the relationship thereto of varying periods of light and darkness.

A yet further object of my invention is to provide a device of the character herewithin described in which access can be obtained to plant growth at all times for the purpose of checking and tabulating the results, of the plant growth.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 3 is an end elevation of my device sectioned in part to show the interior thereof.

FIGURE 4 is an enlarged end view of the illuminating assembly per se.

In the drawings like characters of reference indicate corresponding parts in the different figures.

Figure 1:
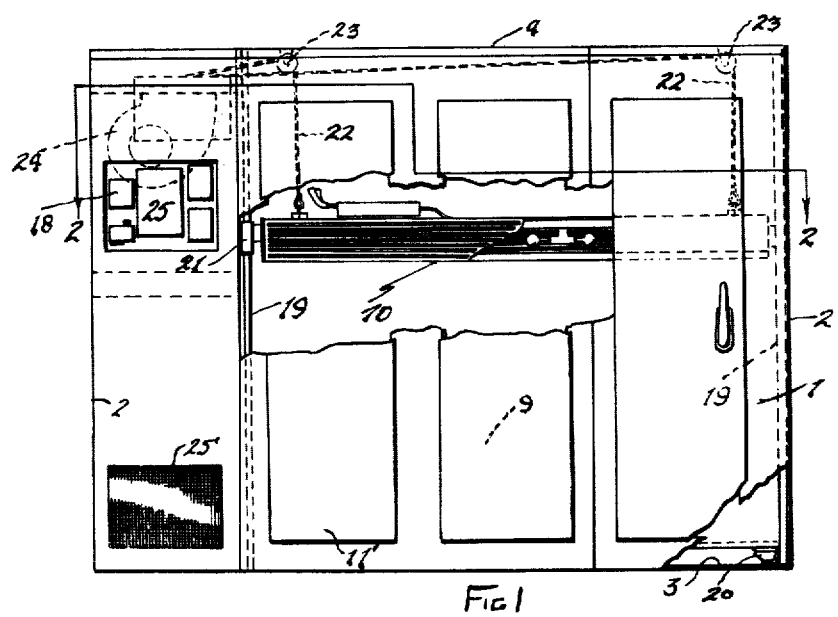
FIGURE 1 is a side elevation of my device sectioned in part to show the interior.
Figure 2:
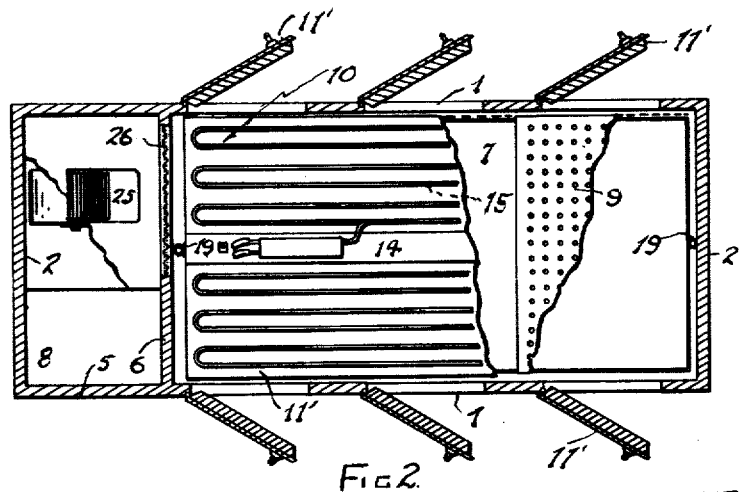
FIGURE 2 is a section substantially along the lines 2—2 of FIGURE 1.

In the science of plant growth, it is known that temperature, humidity and high, but controlled light intensity and duration are all important and heretofore it has been extremely difficult to arrive at accurate results dealing with these conditions.

The present device enables the temperature, humidity and light duration to be controlled accurately at all times thereby advancing considerably the knowledge of the various conditions.

Proceeding therefore to describe my invention in detail, it will be seen upon reference to the accompanying drawings that I have provided a substantially cubicle enclosure including side walls 1, end walls 2, base or floor 3, and roof panel 4, it being understood that these walls are insulated in order to assist in the maintenance of the steady temperature within the enclosure.

Adjacent the end 5 of the enclosure, I have provided a partition 6 thus dividing the enclosure into a plant growth enclosure 7 and an accessory enclosure 8.

The plant growth enclosure 7 includes a plurality of trays 9 resting upon trestle (not illustrated) upon the floor 3 and an illuminating assembly collectively designated 10 spanning the entire plant growth enclosure 7 and situated above the trestle 9. It will also be observed that a plurality of access doors 11 are provided in the side walls 1 of the cabinet so that access can be obtained to plant growth trays (not illustrated) supported by the aforementioned trays 9.

The illuminating assembly collectively designated 10 consists of a carrier 11 which is of inverted V-shape when viewed in end elevation as illustrated in FIGURE 4. Substantially horizontal strut 12 extends from the extremities 13 of the carrier 11 to a centre supporting strut 14 running longitudinally of the illuminating assembly.

A plurality of relatively slender fluorescent lamps 15 extend lengthwise between pairs of sockets 16 upon the underside of the carrier, it being understood that these fluorescent tubes or lamps are relatively close together thus providing a very even source of illumination.

However, as it is well known that fluorescent tubes do not supply light at the lower end of the spectrum, I have provided a plurality of conventional incandescent lamps 17 supported within holders (not illustrated) upon the longitudinal centre support 14.

All of these lamps are connected via conventional wiring methods to switch boxes 18 upon the external wall of the accessory enclosure 8.

The illuminating assembly 10 is adapted to be moved vertically within the plant growth cabinet or enclosure so that the light source can be varied in distance from the plants being grown therein and in this connection I provide a pair of vertical guides 19 adjacent each end of the plant growth enclosure and extending from the upper wall to the floor thereof, being secured by brackets 20. A pair of sleeve bearings 21 are carried upon the extremity of the longitudinal strut 14 and are adapted to engage these vertical guides 19 as clearly illustrated.

Cables 22 extend upwardly from the apex of the carrier 11 of the illuminating assembly and pass over pulleys 23 supported by the upper panel 4 of the enclosure. These cables pass from the pulleys into the accessory enclosure and are attached to a counter-weight or mechanical winch (not illustrated) of a weight sufficient to maintain the illuminating assembly in the desired position after it has once been placed there manually.

The accessory enclosure 8 includes conventional apparatus (not illustrated) including a refrigeration unit and the controls necessary for the operation thereof. It also includes a fan and motor assembly shown in phantom and indicated by the reference character 24 which is adapted to draw air from the exterior through filter 25' and pass it through a further filter 26 in the partition 6, into the interior of the cabinet. By this means the temperature of the interior of the plant growth enclosure may be controlled accurately at all times and the provision of a time clock 25 permits the light to be cycled as desired over any particular period.

In operation, the seeds are planted in conventional trays which are placed upon the trays 8 within the enclosure whereupon the light source may be lowered to the desired distance from the trays and the temperature controlled as necessary. As the plants grow, the light source can be raised to prevent over-heating or burning of the plants and plants can be inspected readily at all times due to the access doors 11.

The base of the plant growth enclosure 7 is sealed and is adapted to receive a layer of water thereby permitting the relative humidity of the enclosure to be maintained at the required level. Also provision is made for auxiliary humidity atomizers, if necessary.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

The embodiments of the invention in which an exclusive property or privilege is claimed are defined as follows:

A plant growth cabinet comprising a substantially rectangular housing including a pair of side walls, a pair of end walls, a floor and a roof, a transverse partition provided in said housing adjacent one of said end walls and separating the interior of the housing into a relatively large plant growth compartment and a relatively small utility compartment, said side walls of the housing being provided with openable doors communicating with said plant growth compartment, plant supporting trays provided at fixed levels in the plant growth compartment, a luminaire suspended from the roof of the housing in the plant growth compartment and disposed above said plant supporting trays, said luminaire being substantially coextensive in a horizontal plane with the area of the plant growth compartment, means for raising and lowering said luminaire relative to the plant supporting trays, said luminaire including both incandescent and fluorescent sources of light and the walls and roof of said housing being opaque whereby said incandescent and fluorescent light sources constitute sole sources of light for plants supported by said trays, said partition being provided with an opening, an air filter mounted in said opening, a motor driven air blower disposed in said utility compartment, said blower having an inlet communicating with the atmosphere and an outlet discharging into the utility compartment whereby fresh air may be delivered through said filter into the plant growth compartment, the floor of said housing being leakproof and carrying a layer of water for humidifying the air in the plant growth compartment, a pair of vertical guides provided in said plant growth compartment adjacent said partition and adjacent the relatively opposite end wall of said housing, said luminaire including a frame and means on said frame slidably engaging said guides whereby the luminaire may be guided in its raising and lowering movement, said means for raising and lowering the luminaire including cables connected at one end thereof to the luminaire, pulleys provided at the underside of said roof, said cables passing over said pulleys and into said utility compartment, and a counterweight disposed in the utility compartment and connected to the other end of said cables.

References Cited in the file of this patent

UNITED STATES PATENTS

| | | |
|---|---|---|
| 766,281 | Peck | Aug. 2, 1904 |
| 1,026,576 | Frieling | May 14, 1912 |
| 1,121,722 | Fessenden | Dec. 22, 1914 |
| 1,827,530 | Le Graud | Oct. 13, 1931 |
| 2,312,618 | Beck | Mar. 2, 1943 |
| 2,877,340 | Spaulding | Mar. 10, 1957 |
| 2,907,872 | Wilson | Oct. 6, 1959 |

OTHER REFERENCES

Pages 37 through 39 of the January 1955 issue of Consumer Reports, published by Consumer's Union, Mt. Vernon, N.Y.

UNITED STATES PATENT OFFICE
CERTIFICATE OF CORRECTION

Patent No. 3,108,399                              October 29, 1963

Russell M. Fraser

It is hereby certified that error appears in the above numbered patent requiring correction and that the said Letters Patent should read as corrected below.

In the grant, lines 1 to 3, for "Russell M. Fraser, of Winnipeg, Manitoba, Canada," read -- Russell M. Fraser, of Winnipeg, Manitoba, Canada, assignor to Fleming-Pedlar Limited, of Winnipeg, Manitoba, Canada, --; line 12, for "Russell M. Fraser, his heirs" read -- Fleming-Pedlar Limited, its successors --; in the heading to the printed specification, lines 3 and 4, for "Russell M. Fraser, 634 Campbell St., Winnipeg, Manitoba, Canada" read -- Russell M. Fraser, Winnipeg, Manitoba, Canada, assignor to Fleming-Pedlar Limited, Winnipeg, Manitoba, Canada --.

Signed and sealed this 23rd day of November 1965.

(SEAL)
Attest:

ERNEST W. SWIDER                                                                     EDWARD J. BRENNER
Attesting Officer                                                                       Commissioner of Patents